Aug. 21, 1923.
A. CÔTÉ
HOOK
Filed Sept. 12, 1921
1,465,510
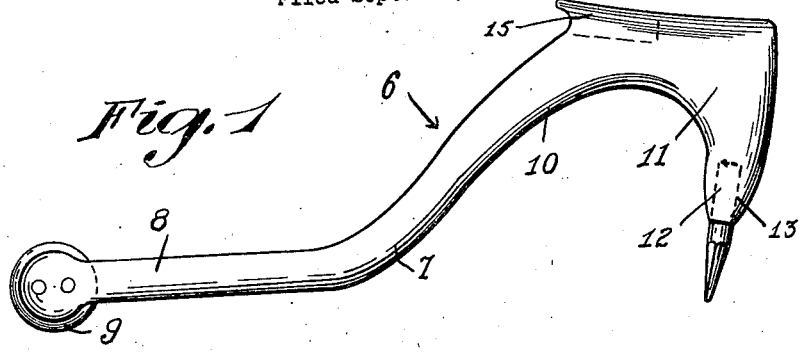
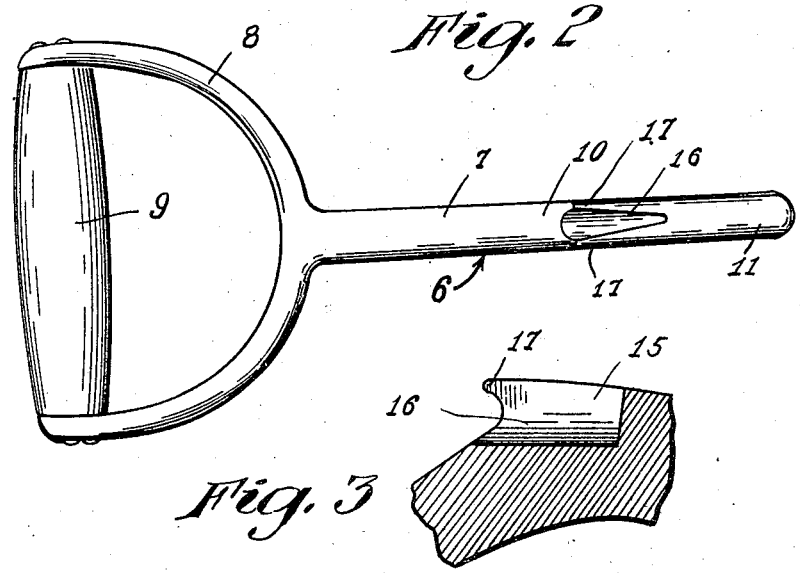
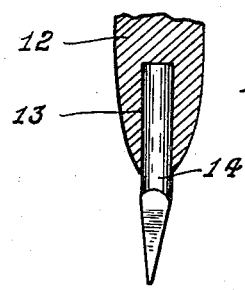
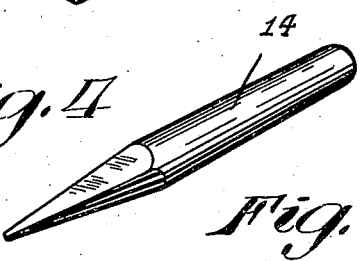
Inventor
Alphonse Côté
By William Clinton
Attorney Patented Aug. 21, 1923.

1,465,510

UNITED STATES PATENT OFFICE.

ALPHONSE CÔTÉ, OF EEL RIVER, NEW BRUNSWICK, CANADA.

HOOK.

Application filed September 12, 1921. Serial No. 500,072.

*To all whom it may concern:*

Be it known that I, ALPHONSE CÔTÉ, a subject of the King of Great Britain, residing at Eel River, in the Province of New Brunswick, Canada, have invented certain new and useful Improvements in Hooks; and I do hereby declare that the following is a full, clear, and exact description of the invention, such as will enable others skilled in the art to which it appertains to make and use the same.

The present invention relates to new and useful improvements in hooks and more particularly to that class adapted for use in logging camps for moving logs from one position to another.

The primary object of the invention is the provision of a hook which can be grasped in the hand of the operator and manipulated to engage the log or the like whereby the latter can be moved from one position to another.

Another object of the invention is the provision of a hook having a detachable sharpened point which may be inserted into the log for the purpose of moving the latter as desired.

Still another object of the invention is the provision of a hook such as above referred to, having a removable point which may be used when desired, and a socket for receiving the said point when the latter is not in use, or for receiving an additional point in case the one in use breaks or becomes dull.

A still further object of the invention is the provision of a hook such as above referred to, which will be comparatively simple and inexpensive to manufacture, reliable and efficient in use, and readily operated.

With the above and other objects in view, the present invention resides in the novel features of construction, formations, combinations, and arrangements of parts, to be hereinafter more fully described, claimed, and illustrated in the accompanying drawing forming a part of the present application; and in which:

Figure 1 is a side view of the invention;

Figure 2 is a plan view thereof;

Figure 3 is a detail sectional view taken through the upper socket;

Figure 4 is a similar view taken through the lower socket showing the point positioned therein; and, Figure 5 is a detail perspective view of the point removed.

Referring now to the accompanying drawing, by corresponding characters of reference throughout the several views, the numeral 6 designates in general my improved hook, which comprises a shank 7 provided at one end thereof with a yoke 8 the ends of which are connected by a handle portion 9 by means of which the said hook may be grasped by the operator.

The shank 7 curves upwardly from the yoke 8 as shown at 10 and is provided with a head 11 and has a downwardly projected point 12 extending therefrom.

This point 12 is provided with a suitable socket 13 for receiving the socket point 14 which may be removably engaged therein. A pair of lugs are shown at 15, formed upon the head 11 and serve the purpose of a nail puller to remove nails and the like from the logs.

The upper portion of the head 11 is cut away between the lugs to form a tapered socket 16, the lugs being provided with a pair of lips 17 which engage the nail without obstructing the nail head from view.

From the foregoing description taken in connection with the accompanying drawing, it will be manifest that a hook of the nature described is provided which will fulfil all of the necessary requirements of such a device, and it should be understood in this connection, that various minor changes in the specific details of construction can be resorted to within the scope of the appended claims, without departing from the spirit or sacrificing any of the advantages of the invention.

Having thus fully described the invention, what I claim as new and desire to protect by Letters Patent is:—

1. The herein described hook having a shank, a head having an inturned point at one end thereof, lugs provided upon the head, and lips formed on the free ends of said lugs.

2. The herein described hook comprising a shank and a head having an inturned point at one end thereof, and a nail puller provided on said head.

In witness whereof I have hereunto set my hand.

ALPHONSE CÔTÉ.